US 11,176,251 B1

United States Patent
Plantenga et al.

(10) Patent No.: US 11,176,251 B1
(45) Date of Patent: Nov. 16, 2021

(54) DETERMINING MALWARE VIA SYMBOLIC FUNCTION HASH ANALYSIS

(71) Applicant: FireEye, Inc., Milpitas, CA (US)

(72) Inventors: Todd Plantenga, Livermore, CA (US); Damieon Stark, Falls Church, VA (US); Peter Silberman, Kensington, MD (US)

(73) Assignee: FireEye, Inc., Milpitas, CA (US)

( * ) Notice: Subject to any disclaimer, the term of this patent is extended or adjusted under 35 U.S.C. 154(b) by 58 days.

(21) Appl. No.: 16/724,031

(22) Filed: Dec. 20, 2019

Related U.S. Application Data

(60) Provisional application No. 62/784,231, filed on Dec. 21, 2018.

(51) Int. Cl.
*H04L 29/06* (2006.01)
*G06F 21/56* (2013.01)

(52) U.S. Cl.
CPC ...... *G06F 21/563* (2013.01); *G06F 2221/033* (2013.01)

(58) Field of Classification Search
CPC .... G06F 21/563; G06F 21/564; G06F 21/565; G06F 21/566; G06F 2221/033; H04L 63/1416; H04L 63/145; H04L 63/1433
See application file for complete search history.

(56) References Cited

U.S. PATENT DOCUMENTS

| | | | |
|---|---|---|---|
| 6,898,632 B2 | 5/2005 | Gordy et al. | |
| 6,941,348 B2 | 9/2005 | Petry et al. | |

(Continued)

FOREIGN PATENT DOCUMENTS

| | | | |
|---|---|---|---|
| GB | 2439806 A | 1/2008 | |
| GB | 2490431 A | 10/2012 | |

(Continued)

OTHER PUBLICATIONS

"Mining Specification of Malicious Behavior"—Jha et al., UCSB, Sep. 2007 https://www.cs.ucsb.edu/.about.chris/research/doc/esec07.sub.--mining.pdf-.

(Continued)

*Primary Examiner* — Hosuk Song
(74) *Attorney, Agent, or Firm* — Rutan & Tucker, LLP

(57) ABSTRACT

A device for classifying malware including a processor, and a storage device storing a plurality of previously classified symfunc hash values and malware detection logic which attempts to classify malicious code by utilizing binary disassembler logic processed by the processor. Binary disassembler logic can be configured to receive a suspicious binary object and disassemble the binary object into disassembled code data, while symbolic analyzer logic can be configured to receive the disassembled code data and generate symbolic representation data. Generation logic can be configured to receive the symbolic representation data and generate at least one symfunc hash value based on the symbolic representation data. Finally, classification logic can be configured to receive at least one symfunc hash value, compare the symfunc hash value against previously classified symfunc hash values, and determine if the binary object comprises malicious code based on the associated symfunc hash value. The reporting logic can issue an alert reporting the malicious code or initiate the execution of a pre-determined action.

27 Claims, 6 Drawing Sheets

(56) References Cited

U.S. PATENT DOCUMENTS

| | | |
|---|---|---|
| 7,080,407 B1 | 7/2006 | Zhao et al. |
| 7,080,408 B1 | 7/2006 | Pak et al. |
| 7,243,371 B1 | 7/2007 | Kasper et al. |
| 7,308,716 B2 | 12/2007 | Danford et al. |
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,208,235 B1 * | 12/2015 | Liu ................. G06F 16/951 |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,507,945 B2 * | 11/2016 | Kouskoulas .......... G06F 21/577 |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,542,559 B2 * | 1/2017 | Brumley ................. G06F 21/51 |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B2 | 8/2017 | Watters et al. |
| 9,756,074 B2 | 9/2017 | Aziz et al. |
| 9,773,112 B1 | 9/2017 | Rather et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |

(56) References Cited

U.S. PATENT DOCUMENTS

| | | |
|---|---|---|
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,417,422 B2 * | 9/2019 | Zhang .................. G06F 40/253 |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 | 11/2019 | Kindlund et al. |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 * | 11/2019 | Su ....................... H04L 63/1416 |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,853,483 B2 * | 12/2020 | Ikuse ..................... G06F 21/53 |
| 10,855,700 B1 | 12/2020 | Jeyaraman et al. |
| 10,868,818 B1 | 12/2020 | Rather et al. |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |

(56) References Cited

U.S. PATENT DOCUMENTS

| | | |
|---|---|---|
| 10,929,266 B1 | 2/2021 | Goradia et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |

(56) References Cited

U.S. PATENT DOCUMENTS

| | | | |
|---|---|---|---|
| 2016/0127393 | A1 | 5/2016 | Aziz et al. |
| 2016/0191547 | A1 | 6/2016 | Zafar et al. |
| 2016/0191550 | A1 | 6/2016 | Ismael et al. |
| 2016/0241580 | A1 | 8/2016 | Watters et al. |
| 2016/0241581 | A1 | 8/2016 | Watters et al. |
| 2016/0261612 | A1 | 9/2016 | Mesdaq et al. |
| 2016/0285914 | A1 | 9/2016 | Singh et al. |
| 2016/0301703 | A1 | 10/2016 | Aziz |
| 2016/0323295 | A1 | 11/2016 | Joram et al. |
| 2016/0335110 | A1 | 11/2016 | Paithane et al. |
| 2017/0083703 | A1 | 3/2017 | Abbasi et al. |
| 2018/0013770 | A1 | 1/2018 | Ismael |
| 2018/0048660 | A1 | 2/2018 | Paithane et al. |
| 2018/0069891 | A1 | 3/2018 | Watters et al. |
| 2018/0121316 | A1 | 5/2018 | Ismael et al. |
| 2018/0288077 | A1 | 10/2018 | Siddiqui et al. |
| 2019/0104154 | A1 | 4/2019 | Kumar et al. |
| 2019/0132334 | A1 | 5/2019 | Johns et al. |
| 2019/0207966 | A1 | 7/2019 | Vashisht et al. |
| 2019/0207967 | A1 | 7/2019 | Vashisht et al. |
| 2020/0089882 | A1* | 3/2020 | Menahem ............. G06N 20/00 |
| 2020/0252428 | A1 | 8/2020 | Gardezi et al. |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].

Heng Yin et al, Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike , "Designing Network Security", ("Kaeo"), (Nov. 2003).

Kevin A Roundy et al.: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

(56) References Cited

OTHER PUBLICATIONS

Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendertvan Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

DETERMINING MALWARE VIA SYMBOLIC FUNCTION HASH ANALYSIS

PRIORITY

This application claims priority to U.S. Provisional Patent Application No. 62/784,231, filed Dec. 21, 2018, titled "Determining Malware Via Symbolic Function Hash Analysis," the disclosure of which are hereby incorporated herein by reference in its entirety.

FIELD OF THE INVENTION

Embodiments of the disclosure relate to the field of network security. More specifically, one embodiment of the disclosure relates to a system, apparatus and method for determining the presence of malware within a binary object.

BACKGROUND

Over the last decade, malicious software (malware) has become a pervasive problem for Internet users. In some situations, malware is a program or file that is embedded within downloadable content and designed to adversely influence (i.e. attack) normal operations of a computer. Examples of different types of malware may include bots, computer viruses, worms, Trojan horses, spyware, adware, or any other programming that operates within the computer without permission.

For instance, content may be embedded with objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

Over the past few years, various types of security methods have been deployed that have attempted to find malware within files or other network content. Often, these methods compare a segment of code to a previously known segment that has already been determined to be malicious. While sometimes effective, these methods are often "brittle," meaning that changes, even very slight changes to the code may not yield a match and thus become a false negative result, allowing a system to become vulnerable to the changed code. These changes to codes may be done on purpose by the malware creators to evade detection, or they may be the result of changes in the tools used to create the malware. In other cases, even slight changes by the malware creators, including updating their compiler programs, may alter the final malware code just enough to evade detection by brittle systems.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
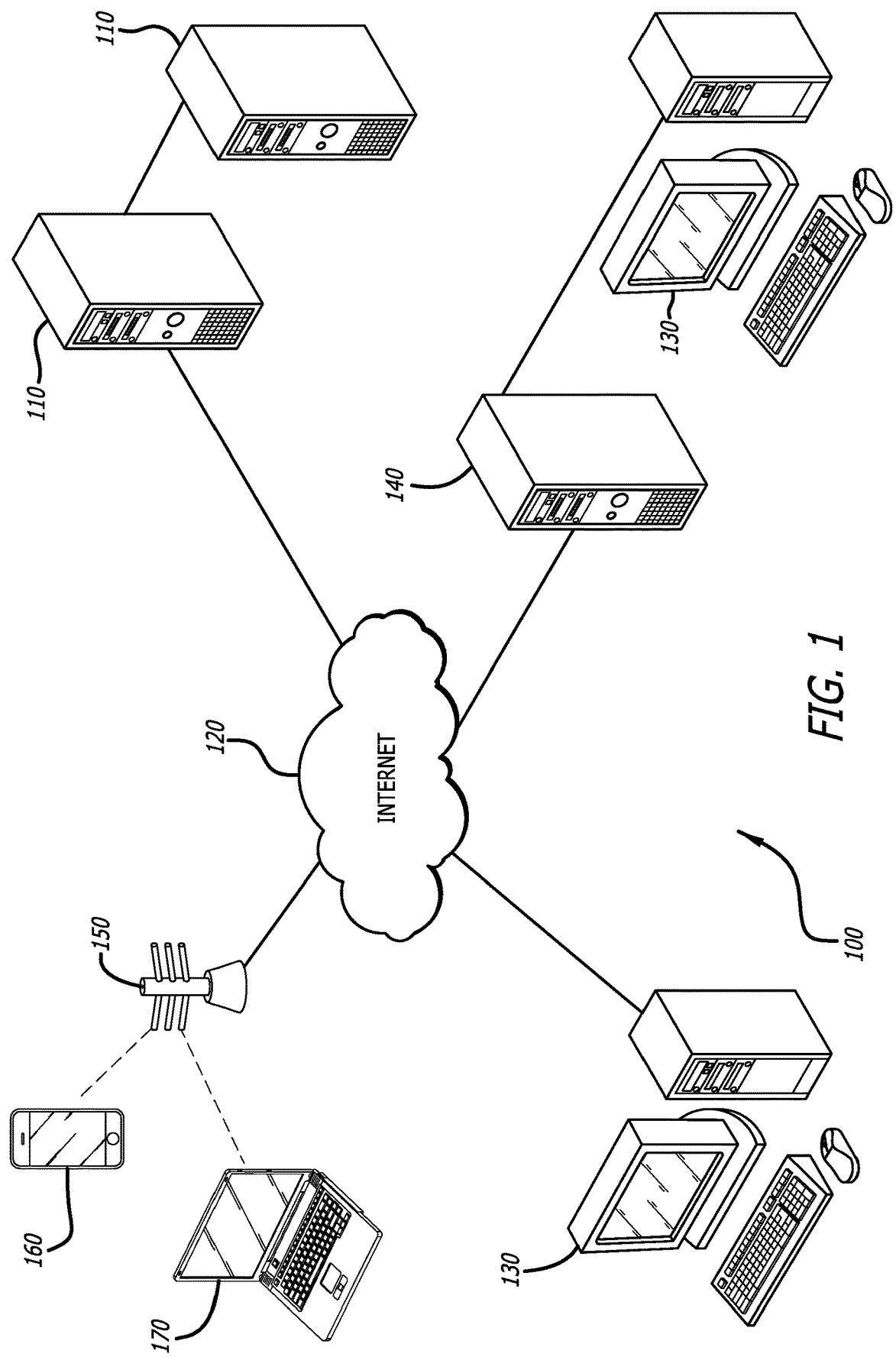
FIG. 1 is an exemplary system diagram of a communication network deploying a plurality of malware content detection (MCD) devices.

Various embodiments of the disclosure relate to a process configured to generate and analyze a symbolic function ("symfunc") hash from a given piece of binary code. In general, the generation of the symfunc hash value is compared against previously logged symfunc hash values to associate the potential behaviors of a newly generated symfunc hash value to those previously generated, stored, and/or documented. Based on this method, the detection of malware in accordance with the invention avoids being "brittle," thereby making the detection technique less susceptible to evasion techniques such as modification of the malware code. This process can be accomplished through a series of data processing steps that can be accomplished within a malware content detection ("MCD") system.

One feature of the present invention is to generate an abstraction of a suspected binary object that can be compared to other abstractions of potentially related binary objects. The abstraction process can be accomplished in such a way that reliable information about the suspected binary object can be determined. This process can be enhanced by filtering non-differentiating features from the generated abstraction such that unique and/or differentiating features can be more easily determined and compared against similarly abstracted objects. This abstraction may be improved by analyzing and abstracting the suspected binary objects based on the contained functions and corresponding calls to and from the object, as well as examining various reads and writes to memory. In this way, small changes in the suspected binary object may be abstracted out of the final hash value used for comparison against other previously analyzed binary objects.

More specifically, the MCD system can be configured to receive a plurality of binary code samples for analysis, which are then disassembled into various opcodes or other disassembled code data. The opcodes, or other disassembled code, may then be processed by the MCD to be further abstracted into a symbolic representation as a list of short equations ("symboliks"). The symboliks may then be further abstracted into a symfunc object by the MCD. In order to reduce an amount of time needed for processing and/or analysis, the symfunc object undergoes a hash operation through a specific and repeated heuristic method to generate a manageable symfunc hash value.

After the generation, the symfunc hash value may be compared to a collection of previously generated symfunc hash values, related to previously detected malware, to associate known characteristics of a code family to the symfunc hash values generated from the binary code sample. Thus, characteristics of the binary code sample can be determined from the comparison of the symfunc hash value generated from the process outlined in the instant application. These determined characteristics can include whether the binary code sample contains malicious code including, but not limited to, keylogging, worms, trojan horses, and/or viruses.

According to one embodiment of the disclosure, previously generated symfunc hash values can be stored within a single central data store or database and utilized for comparison either on a front-line appliance, or remotely as a service. Each symfunc has data associated with its corresponding binary object that was used to generate the symfunc hash. The entire symfunc hash data store can be over one terabyte in size, and be publicly available, internally up kept, or publicly available while supplemented with private data.

Known symfunc hash values can be utilized to group binary objects associated with the known symfunc hash values to code family groups. These code families can be utilized to more easily determine the source of a malicious binary object. Code families are typically grouped by human analysts based on similar "fingerprints" or structure of code including, but not limited to, morphology, targets and methods of attack. One aspect of the present invention is to automatically generate associations of binary objects to code families based on matches found in a symfunc database. In this way, a faster determination of the source of a malicious binary object (from a hostile nation state, etc.) is possible.

I. Terminology

In the following description, certain terminology is used to describe features of the invention. For example, in certain situations, the terms "logic" and "engine" are representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

Alternatively, or in combination with the hardware circuitry described above, the logic (or engine) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "network content" generally refers to information transmitted over a network, proprietary or public (e.g. the Internet). The network content may present as one or more messages, namely a grouping of information that comprises a header and a payload, such as any of the following: a packet; a frame; a stream being a sequence of packets or frames; an Asynchronous Transfer Mode "ATM" cell; or any other series of bits having a prescribed format. The "payload" is generally defined as including the data associated with the message such as text, software, an image, an object, audio, video, a Uniform Resource Locator (URL), or other types of digital data. The "header" is generally defined as including control information. However, the specific types of control information depend on the network content type.

Other examples of network content include email, which may be transmitted using an email protocol such as Simple Mail Transfer Protocol (SMTP), Post Office Protocol version 3 (POP3), or Internet Message Access Protocol (IMAP4). A further example of network content includes an Instant Message, which may be transmitted using Session Initiation Protocol (SIP) or Extensible Messaging and Presence Protocol (XMPP) for example. Yet another example of network content includes one or more files that are transferred using a data transfer protocol such as File Transfer Protocol (FTP) for subsequent storage on a file share. Where the network content is email, Instant Message or a file, the header may include the sender/recipient address, the sender/recipient phone number, or a targeted network location of the file, respectively.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "object" generally refers to content in the form of an item of information having a logical structure or organization that enables it to be classified for purposes of analysis for malware. One example of the object may include an email message or a portion of the email message. Another example of the object may include a storage file or a document such as a Portable Document Format (PDF) document, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device.

Lastly, the terms "or" and "and/or" as used herein are to be interpreted as inclusive or meaning any one or any combination. Therefore, "A, B or C" or "A, B and/or C"

mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary system diagram of a communication network 100 deploying a plurality of malware content detection (MCD) devices 110 communicatively coupled to a transmission medium such as a network, e.g., the Internet 120. The MCD devices 110 may also be as communicatively coupled with other electronic devices over private and/or public transmission mediums, such as electronic portable computers 170 or portable cellular phones 160 either through a direct connection or via a wireless network access point 150. The MCD device 110 may also be communicatively coupled to a personal computing system 130 over the Internet 120. Some personal computers 130 may also be commutatively coupled to a local MCD 140.

Each MCD device 110 can be adapted in many embodiments to receive and process binary code samples taken from network content for potential malicious code in real-time or at least near real-time. The network content is considered to be "suspicious" when a portion of the network content (e.g. payload data) is determined, with a certain level of likelihood, to include malware. In further embodiments, the binary code and/or binary content can be provided in an offline process such as, but not limited to, a user/system administrator presenting the data to be processed in the form of a drive coupled to the MCD device 110.

According to this embodiment of the communication network, a remote MCD system 110 may be a web-based security appliance that is configured to inspect ingress data traffic, identify whether any artifacts of the data traffic may include malware, and if so, analyze at least those artifacts. Unlike typical methods, this analysis does not need to be conducted in a virtual machine execution environment to detect anomalous behaviors that would be present if the data traffic were actually processed by an electronic device. Instead, the MCD system 110 may generate a symfunc hash value and compare it to previously generated symfunc hash values. The particulars of this analysis are described below.

As shown in FIG. 1, the MCD system 110 may be deployed as an inline security appliance (not shown) or coupled to a network as a local MCD device 140 via a network tap (e.g., a data/packet capturing device). In some embodiments, the local MCD device 140 may be integrated into a remote MCD system 110, provided as a standalone component, or integrated into different network components such as a firewall, a router, a switch or other type of network relay device such as a wireless network access point 150. The local MCD device 140 may include a digital network tap configured to monitor network content (data traffic) and provide a copy of the data traffic along with its meta-information to a remote MCD system 110 or cluster of MCD systems 110 for analysis. The data traffic may comprise signaling transmitted over the Internet 120, including data from/to remote servers.

As further shown in FIG. 1, a personal computer may have an internal MCD system installed either as a communication-based security appliance or as software capable of delivering instruction to the processor to function similar to an MCD device 110. Such configurations can allow personal desktop computers 130 to analyze and report suspicious network content, such as malware within an incoming communication message (e.g., email message, short message service "SMS" message, etc.). As shown, second MCD system $110_2$ may be positioned within a message transfer agent (MTA) deployed in network 130 as shown or connected to network 130 via a network tap.

It is contemplated that one or more MCD devices 110 may be deployed across cloud computing services for malware detection as described. Furthermore, it is contemplated that the functionality of one or more MCD devices 110 may be incorporated into another management system when malware detection is to be conducted at a centralized resource.

Figure 2:
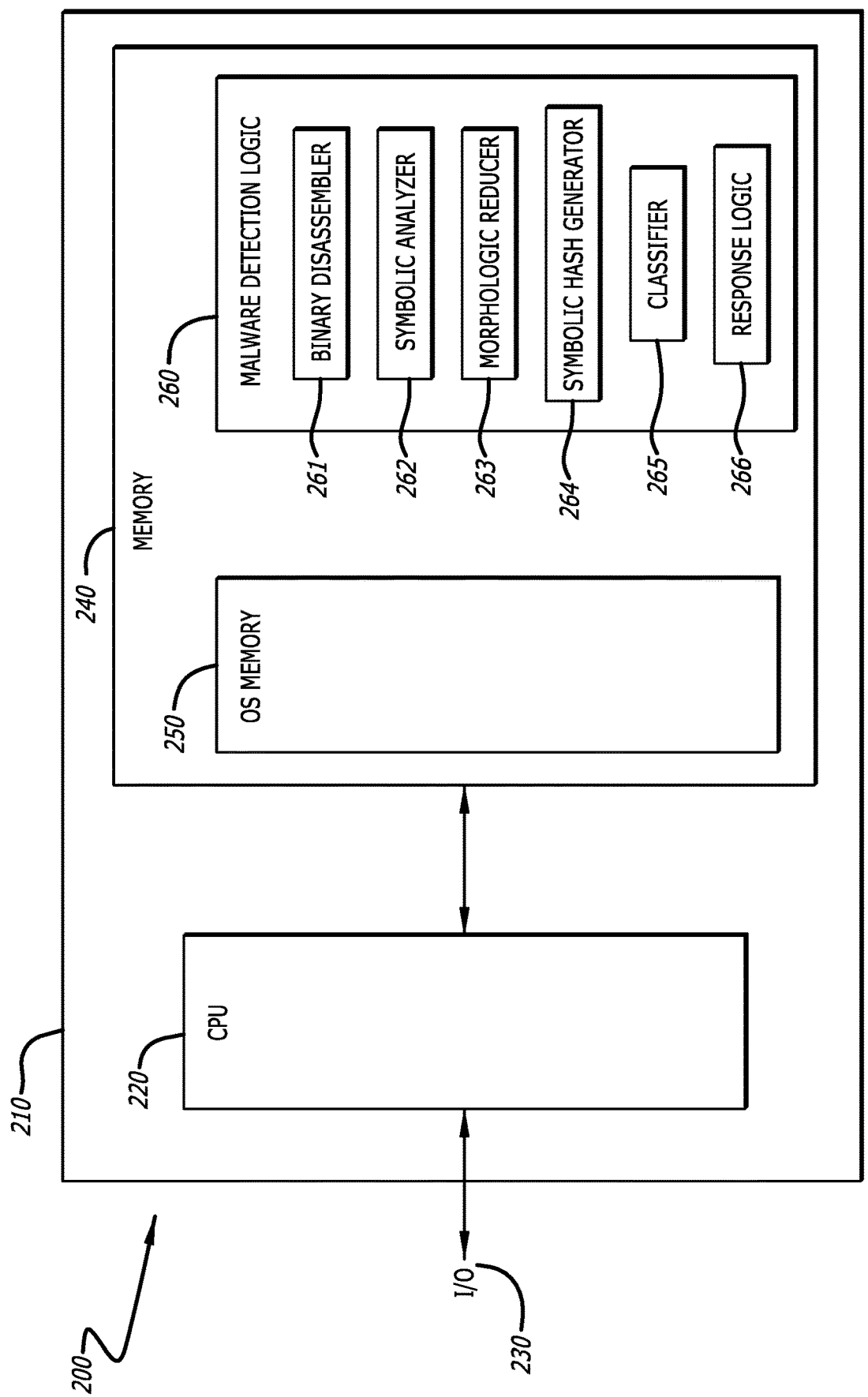
FIG. 2 is an exemplary hardware block diagram of a malware content detection (MCD) device.

Referring now to FIG. 2, an exemplary hardware block diagram of a malware content detection (MCD) device system 200. The MCD device 210 and respective hardware can be similar to the MCD devices 110, 140 as depicted and discussed in FIG. 1. The MCD device 210 comprises one or more processors (e.g., CPU) 220, which is coupled to communication input/output interfaces 230 as well as to a persistent memory system 240. Within the persistent memory system 240 of the embodiment depicted in FIG. 2, various logics may be provided including an OS logic (referred to as "OS memory") 250, and a malware detection logic 260. The malware detection logic 260 further comprises binary disassembler logic 261, symbolic analyzer logic 262, morphologic reducer logic 263, symbolic hash generation logic (referred to as "symbolic hash generator") 264, threat classification logic (referred to as "classifier") 265, and response logic 266.

The input/output interface 220 can enable communications with other components including other MCD systems 110, 140 as depicted in of FIG. 1 as well as other electronic devices over private and/or public networks like the Internet 120. According to one embodiment of the disclosure, the input/output (I/O) interface 230 may be implemented as a physical interface including one or more ports for wired connectors. Alternatively, the entire MCD system 210 can be implemented as software and the input/output interface is implemented as a digital communication logic between the MCD device 210 and other software interfaces. Additionally, or in the alternative, the I/O interface 230 may be implemented with one or more radio units for supporting wireless communications with other electronic devices.

In certain embodiments, the processor 220 can be communicatively coupled to persistent storage 240 over an external transmission medium via the I/O interface 230. According to one embodiment of the disclosure, the persistent storage 240 may load the malware detection logic 260 within a volatile memory for execution. Of course, in embodiments where the logic is implemented as hardware, malware detection logic 260, including the sub components of the binary disassembler 261, the symbolic analyzer 262, morphologic reducer 263, symbolic function hash generator 264, and (threat) classifier 265 would be implemented separately from persistent memory 240.

The malware detection logic 260 may be comprised of many sub-components or sub-systems with internal logic suited for particular tasks. In one embodiment illustrated in FIG. 2, the malware detection logic 260 comprises separate binary disassembler logic 261, symbolic analyzer logic 262, morphologic reducer logic 263, symbolic hash generator logic 264, classifier logic 265, and response logic 266.

In many embodiments, the binary disassembler logic 261 can accept suspect binary objects as an input and disassemble the binary object into a series of opcodes along with other data including functional meta-information such as function start and end points along with various function calls. The disassembly can be accomplished through a variety of methods, but typically involves recursive code flow disassembly. Such disassembly can utilize tools including, but not limited to customized builds of readily available commercial or open source disassembler tools. In some embodiments, the disassembler logic 261 can be located within a separate system or MCD device 210. In these embodiments, the input binary objects may be passed across a network or other communication channel to the remote binary disassembler logic for processing and return.

The types of output data from the binary disassembler logic 261 can also include a serial list of functions, a cross-reference list to other functions called or referenced. Additional embodiments may extract string and integer constants from functions for further analysis or elimination. Finally, many embodiments of the binary disassembler logic 261 can generate a control flow graph (CFG) of every function within the suspect binary object input. Collectively, all of these opcodes, CFGs, lists, and other meta-information can be contained and/or classified as disassembled code data for passing to other components for further processing.

For example, symbolic analyzer logic 262 can accept disassembled code data as input generated from the binary disassembler logic 261 or elsewhere either locally or remotely. Symbolic analyzer logic 262 can generate semantic representations of the input functions as symbolic representation data, which allows for a further abstraction of the suspect binary object.

This process can be accomplished in numerous ways. In many embodiments, the symbolic analyzer logic 262 can generate an emulation environment of actual hardware and attempt to determine what the symbolic execution would be for a given path. In certain embodiments, the emulation is a representation of a given hardware system at a particular, pre-determined state. In other embodiments, a full virtualization environment could be utilized. The symbolic analyzer logic 262 can emulate a variety of systems including Intel® X86 and X64 style architectures. It would be well understood to those skilled in the art that similar emulation methods could be extended to any of a variety of hardware architectures and systems including, but not limited to, ARM, PowerPC, and RISC based architecture families.

It would be understood by those skilled in the art, that when utilizing an emulation system, the problem of what code path to take is present. Depending on the complexity of the function involved, the number of potential options and paths increases exponentially and can become unwieldy to compute. In many embodiments, a heuristic path is utilized for the emulation path traversal. These heuristic paths can include, but are not limited to, shortest path, longest path, longest reachable path, specific property path, predictive look ahead path, and/or weighted paths based on various aspects like function calls and data writes.

In a number of embodiments, the emulated system begins at the same state for each evaluation in order to replicate results. The symbolic analyzer logic 262 can process the disassembled code and determine various actions that would be done to hardware via emulation such as, but not limited to, register/flag changes. Through the symbolic representation, it can be determined what each part of the emulated machine is doing during the processing of the disassembled code data. By way of example, it can be determined that two items within memory were added together to make a new value. Such emulation allows the generation of a full symbolic logic description of each part of the disassembled code data. Further chaining of the symbolic logic can yield a map of all changes within an emulated system which may allow a user to track the relationships between the inputs and outputs of a suspected binary object.

Because the symbolic analyzer logic 262 analyzes, fully evaluates, and generates full symbolic logic for each part of the disassembled code data, the final symbolic representation data can be larger than the input data of the disassembled code data, which is itself typically larger than the suspected binary object. In many instances the increased size of the symbolic representation may reduce the efficiency in processing and contain irrelevant data for the determination of a suspected binary object's attributes. In many embodiments, in order to reduce the amount of irrelevant data to process, and to speed up the eventual parsing and processing of the remaining steps in the evaluation process, morphologic reducer logic 263 may be utilized to accept incoming symbolic representation data and eliminate portions of the symbolic representation data that may not be necessary for further processing and analysis. Those skilled in the art will recognize morphologic reducer logic, such as that provided in The Z3 Theorem Prover™ by Microsoft Corporation of Redmond, Wash. for example or any other satisfiability modulo theories ("SMT") solver.

In a number of embodiments, the morphologic reducer logic 263 may process the symbolic representation data by classifying such data into multiple classes. By way of example and not limitation, the morphologic reducer logic 263 can reduce input data into categories based on whether a function reads or writes to memory, whether a function calls or returns from a function, and/or other function processes that are similar across all functions. Once classified, each category of data can be further processed and/or eliminated based on certain pre-determined rules set by either the system or the user. By way of example and not limitation, the morphologic reducer logic 263 may have rules set up to disregard functions that read from the disk and/or to eliminate data relating to functions based on what functions they return from. Typically, rules governing the morphologic reducer logic 263 can be set up to eliminate elements of the symbolic representation data that may be similar to many other, if not virtually all other function data. For example, certain aspects of binary objects may all have similar calls to various compiler specific functions necessary for normal operation. Because many functions may share similar elements, the possibility of extracting useful information from these aspects of the suspected binary object is extremely low and can typically be eliminated from further processing. Morphologic reducer logic 263 can be set up with predetermined rules from a user/system administrator based on what elements are not valuable for recognizing the functional behavior of binary object analysis.

The output data of the morphologic reducer logic 263 is then a simplified set of equations compared to the input symbolic representation data. These relatively simple list of equations can be considered a symboliks list wherein each individual equation can be considered a "symbolik" The entire package of symboliks can be considered a single symboliks function object or "symfunc object." Typically, in this state, the symfunc object is still in a human-readable state which can illustrate the potential actions of a suspected binary object if it was run within a system similar to the emulated system utilized in the symbolic analyzer logic 262. In order to make the process scalable, the symfunc object data can further be abstracted through the use of symfunc hash generator logic 264 which can take the symfunc object data and output a plurality of hashes for further analysis.

In a number of embodiments, the symfunc hash generator logic 264 accepts symfunc object data as input and outputs a plurality of symfunc hash values as output. In certain embodiments, the hashes can be 128-bit hash values similar to message-digest 5 ("MD5") hashes and can be generated using MD5 algorithms. Those skilled in the art will recognize that alternative hashing methods may be utilized to further abstract the symfunc object data for use in further classifications.

Depending on the type of analysis to be done, the generated symfunc hash values can be obtained by hashing the entire symfunc object data input. Similarly, multiple symfunc hash values may be generated by hashing multiple subsets of the symfunc object data. The amount of hashes produced can be a function of the size of the suspect binary object and resulting symfunc object, but in some embodiments, the amount of hashes generated could also be related to the complexity of the functions within the suspect binary object as well. The generated symfunc hash values can be used as input to classifier logic 265 which can compare the generated symfunc hash values against other known symfunc hash values for large scale classification of the suspect binary object.

Classifier logic 265 may be configured, in one or more embodiments, to accept a plurality of input symfunc hash values and compare the input symfunc hash values to previously generated symfunc hash values. This comparison is conducted to classify the input symfunc hash values based on their similarity to the previously generated symfunc hash values. In many embodiments, classifier logic 265 can generate classification data based on multiple methods of analysis including, but not limited to, a specific method and/or a weighted method.

In response to comparing an input symfunc hash value against previously generated symfunc hash values, the classifier logic 265 can generate data relating to the number of matches found of the input symfunc hash value against the previously generated ones. In many embodiments, certain characteristics relating to the similarity of the input symfunc hash value to previously generated hashes can be determined based on the number of matches between them. By way of example, and not limitation, a symfunc hash value that matches with over a thousand other previously generated symfunc hash values may show that this particular symfunc hash value (and associated suspect binary object) may be common and less of a threat. Alternatively, an input symfunc hash value that does not match to any other previously generated hashes will likely not be able to be correlated in meaningful ways. Thus, when an input symfunc hash value has a match with other previously generated symfunc hash values that is above a first lower pre-determined threshold, but below another higher pre-determined threshold, a strong correlation can be found between the compared symfunc hash values. In certain embodiments, such a symfunc hash value can be understood as an "anchor hash value." Those skilled in the art will recognize that both the higher and lower pre-determined thresholds can be of any value that sufficiently creates a correlation between the input symfunc hash value and the previously generated symfunc hash values and can vary based upon the type of application and results desired by the user/system administrator. The only requirement is that the lower threshold is quantitatively lower than the upper threshold.

As those skilled in the art would recognize, a "match" may be utilized in various ways depending on the application. By way of example, and not limitation, a match may be found by a direct correlation between hash values and/or partial hash values. In further embodiments, a match may be a prescribed level of correlation based on a pre-determined threshold set by the user and/or system administrator. In still further embodiments, a "fingerprint" may be construed as a plurality of indicators that collectively identify an object under analysis against other malware family fingerprints. Malware similarity analysis that can be utilized in accordance with embodiments of the invention are described in U.S. patent application Ser. No. 15/280,854, filed Sep. 29, 2016, entitled "Advanced Malware Detection Using Similarity Analysis" the disclosure of which is hereby incorporated by reference in its entirety. As such, it is contemplated that lower and upper thresholds, as described above, may be other values that correspond to alternative forms of matching.

In a number of embodiments, classifier logic 265 may stop further analysis when an anchor hash value has been found. In the absence of anchor hash values, classifier logic 265 may proceed with a weighted analysis of the symfunc hash values based on the number of matches. Such weighted analysis can be accomplished through the use of statistical tools including a Jaccard index and/or Tanimoto distance, although any number of methods can be utilized to determine the relative relationship between the two sets of data.

Upon generation of the classification data, the system 210 may initiate response logic 266 to take a number of actions including, but not limited to, communicating the findings based on the type of classification data present. For example, the presence of an anchor hash value may allow the system 210 to take immediate steps without further user/system administrator input. Classification data that includes weighted analysis data may be sent via the system I/O 230 to a user/system administrator for further review. In further embodiments, other remedial actions may occur such as quarantining the analyzed binary object, generating a hunt for the binary object throughout the network, and/or ceasing or preventing further processing of the binary object within the system.

III. Basic Binary Object Analysis

Figure 3:
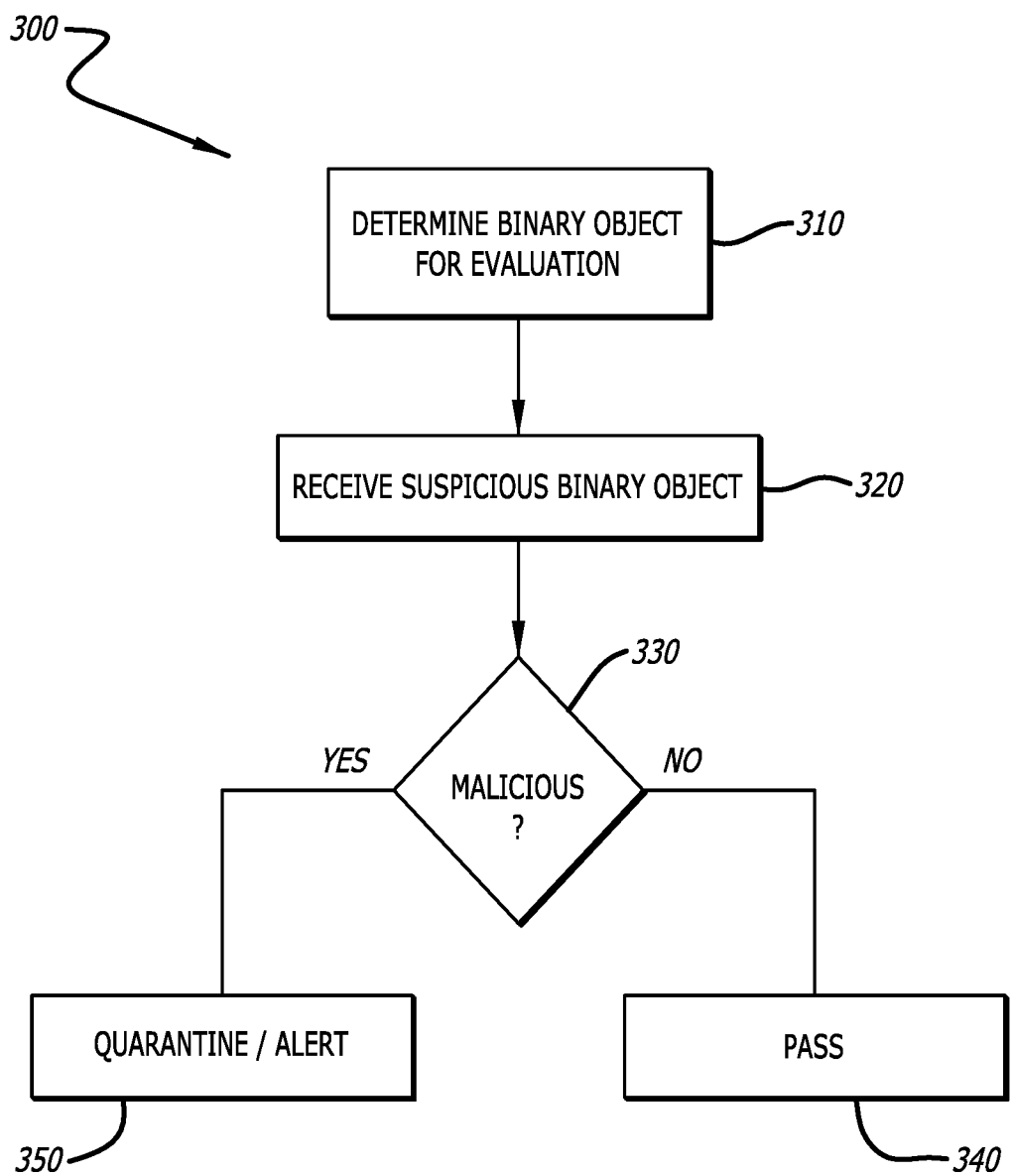
FIG. 3 is an exemplary high-level flowchart of a malware detection process.

Referring to FIG. 3, a high-level overview of the binary object evaluation process 300 is shown. The process 300 as outlined can be accomplished by a variety of devices and methods, including by the device outlined in FIG. 2. The process 300 typically begins when it is determined 310 that a binary object is to be evaluated as potentially malicious. In certain embodiments, this can occur in response to the determination of certain characteristics of the binary object (if it was part of common suspicious network content, other payload data, etc.). In certain embodiments, the determination 310 is accomplished by the MCD system itself. In other embodiments, an outside system determines 310 the binary objects for evaluation and passes them to the MCD.

The MCD system can receive 320 suspicious binary objects for evaluation from remote sources or local devices and/or systems through any viable transmission medium. In response to the receiving 320 of a suspicious binary object, the MCD can then evaluate 330 the resultant hash values derived from the binary object to determine if the binary object is malicious. It is contemplated that the triggers or other thresholds of what is considered malicious by the MCD can be set or adjusted by the user/system administrator. By way of example and not limitation, thresholds may be adjusted periodically on a schedule or aperiodically as needed in response to immediate threats and/or updates. Further, the thresholds may be static or dynamic in nature based on the application. In a number of embodiments, the updating may be done online through a remote updating service. In further embodiments, the updating may be offline and occur via a variety of methods including, but not limited to, updates delivered via thumb drives inserted into the MCD, updates by system administrators via intranet connections, and/or through self-generated updates based on determined variables of the evaluation environment. The evaluation 330 of the binary object is outlined in more detail in FIG. 4.

In response to the evaluation 330 of the suspicious binary object not being malicious, the binary object may be passed along for further processing or execution. Alternatively, if a suspicious binary object is evaluated 330 to be malicious, the MCD can respond by quarantining 350 the binary object and/or generating an alert as defined by the user/system administrator.

IV. Detailed Binary Object Evaluation Process

Figure 4:
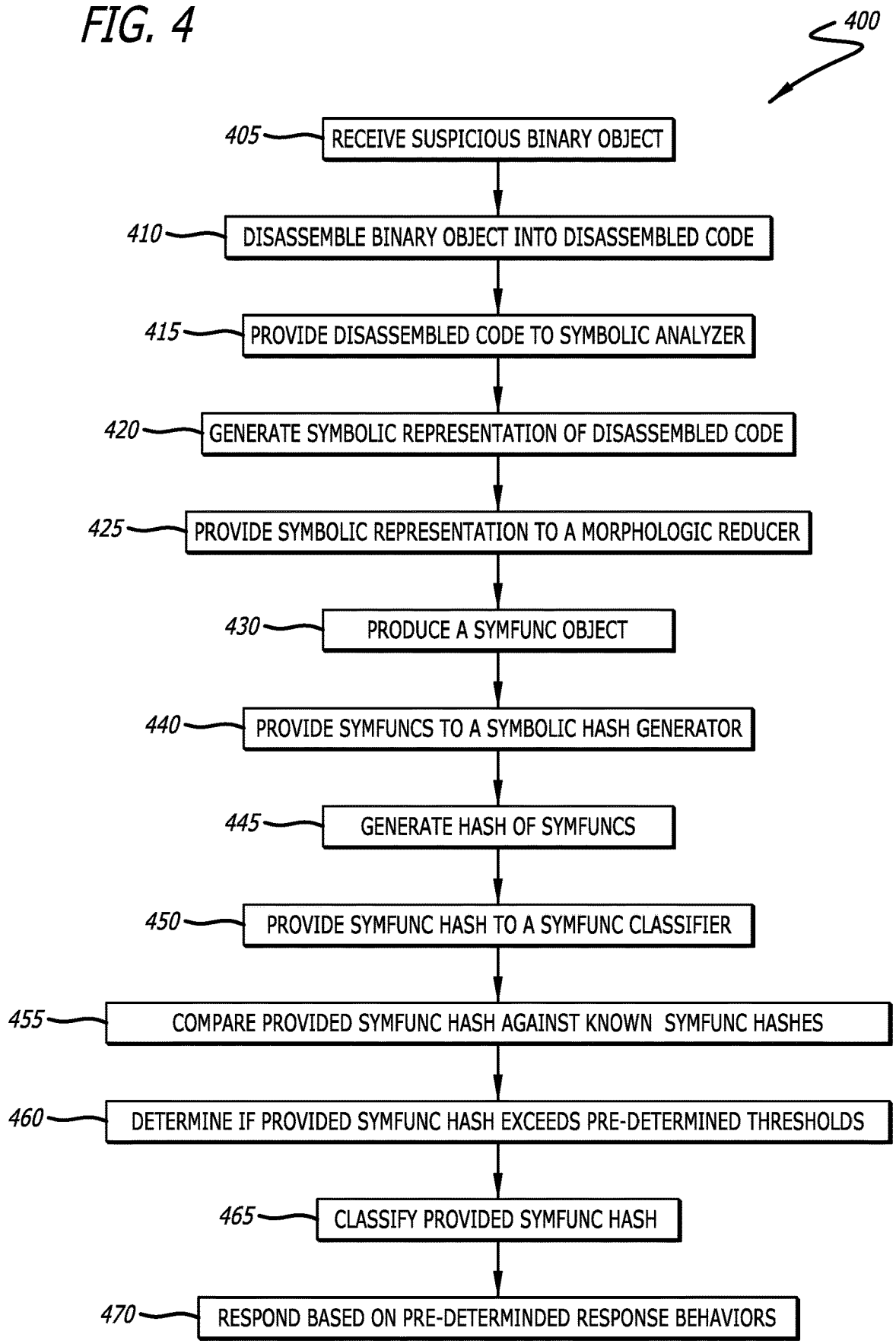
FIG. 4 is an exemplary flowchart illustrating the malware detection process for evaluating a suspicious binary object.

Referring now to FIG. 4, an exemplary evaluation 400 flowchart detailing the processes of evaluating a suspicious binary object is shown. The malware detection logic can receive a suspicious binary object for evaluation (block 405). Binary disassembler logic can disassemble the binary object into opcodes and other disassembled code data including function lists, function calls, function start and end points, as well as control flow graphs of every function (block 410). Binary disassembler logic can then provide the disassembled code to a symbolic analyzer logic (block 415).

Upon receiving the disassembled code data, the symbolic analyzer can generate symbolic representation data of each piece of disassembled code data (block 420). The symbolic representation data can utilize the opcodes and memory maps to analyze the disassembled code data within an emulated system based on pre-determined paths. Upon completion of the generation of symbolic representation data, the symbolic analyzer logic can provide the generated symbolic representation data to a morphologic reducer for further processing (block 425). In certain embodiments, the system may provide the symbolic representation data to the morphologic reducer in pieces as it is generated.

The morphologic reducer logic can produce a symfunc object from the provided symbolic representation data (block 430). The morphologic reducer logic can accomplish this by classifying and removing data from the set of symbolic representation data based on those classifications. The purpose of this reduction is to make the dataset under analysis more manageable, to further abstract out the core functional behavior of the suspicious binary object, and to reduce the elements of the data that are likely common to all similar binary objects and thus, will likely yield little information that would be useful during the later classification steps. By way of example and not limitation, a morphologic reducer may be presented with multiple symbolic representations produced from different binary codes. The binary codes may share similar operations (for example, calling a function) but execute them in a different manner. The abstraction process attempts to reduce these differences away such that the semantic behavior of the function can be identified and analyzed.

The morphologic reducer logic, upon reduction, can provide the generated symfunc objects to a symbolic hash generator (block 440). The symbolic hash generator logic generates symfunc hash values out of the received symfunc objects (block 445). Many symfunc hash values can be generated from a single symfunc object based on various attributes such as, but not limited to, the size of the symfunc object, the complexity of the symfunc object, and/or settings pre-defined by the user/system administrator. In response to the generation of the symfunc hash values, the symfunc hash generator can provide the symfunc hash values to symfunc classifier logic (block 450).

In many embodiments, the classifier logic will take the provided symfunc hash values and compare them against previously known symfunc hash values (block 455). The previously known symfunc hash values typically comprise previously generated hashes that were classified and categorized and are constantly updated with newly generated and classified symfunc hash values. Based on the comparison, the classifier logic can determine if the symfunc hash value exceeds any pre-determined thresholds regarding the number of matches found against the known symfunc hash database (block 460). In many embodiments, the entire hash is compared against the entirety of the other hashes in the symfunc database. However, it is contemplated that a location sensitive hashing could be utilized to evaluate based on only a portion of the generated symfunc hash. Additionally, as outlined above, those skilled in the art would recognize, a "match" may be utilized in various ways depending on the application including determining a prescribed level of correlation based on a pre-determined threshold set by the user and/or system administrator. The user/system administrator can set up these thresholds as needed based on the type of classification desired. Even if no thresholds are met, the classifier logic further weights the symfunc against the previously generated symfunc database in order to classify the provided symfunc hash (block 465).

In response to the classifier logic determining if any thresholds were met or not, classification data is generated upon classifying the provided symfunc hash. It is contemplated that the classification data generated comprises determined threat level, certainty data, matching symfunc hash data, potential code family relationship data, and/or potential origin data. Based on the classification data generated, the classifier logic can respond based on a set of pre-determined response actions or can provide the data to an outside system that responds to the classification data (block 470).

In response to the classifier logic classifying the symfunc hash value (and the corresponding binary object it was generated from) to not be malicious, the system may allow the binary object to pass and proceed with transmission, reception, and/or execution. The system may respond to a classification of a symfunc hash value as malicious in any number of ways, including, but not limited to, quarantining the binary object the symfunc hash value was generated from, generating a report for evaluation by the user/system administrator, adding the symfunc hash value to the collection (e.g., data store or database) of known symfunc hash values, and/or generating an alert to other cybersecurity analysts, and/or providing the associated malicious binary object and associated data to a malware hunting service.

In various embodiments, the responsive action may include, but is not limited to, generating a report/alert, implementing a remedial action (quarantine, network hunt, halting processing, etc.) and/or generating a signature of the binary object. In additional embodiments, the resulting symfunc hash values could be provided to reverse engineering services that may attempt to group similar symfunc hash values in an attempt to classify binary samples, e.g. within a known malware family.

It is contemplated that each step of this evaluation 400 can be accomplished over multiple devices, either remotely or entirely within a single logical framework. By way of example and not limitation, the database of previously generated symfunc hash values can be located within a central store and accessed remotely for evaluation. In certain embodiments, the receiving 405 of a suspicious binary object for evaluation may be delivered by an end user device to an MCD that is remotely located. In some embodiments, the evaluation 400 can be accomplished within a front-line appliance in a network. In further embodiments, the entire evaluation 400 can be embedded and accomplished in the background of another process. In additional embodiments, a binary sample can be uploaded to a global data store re-classification system that may reevaluate the binary sample. Upon the determination that the initial classification was incorrect, subsequent notice and/or thresholds may be sent to MCD devices globally. Re-evaluation techniques that can be utilized in accordance with embodiments of the invention are described in U.S. patent application Ser. No. 16/222,194, filed Dec. 17, 2018, entitled "Platform and Method for Enhanced Cyber-Attack Detection and Response Employing a Global Data Store" the disclosure of which is hereby incorporated by reference in its entirety.

Figure 5:
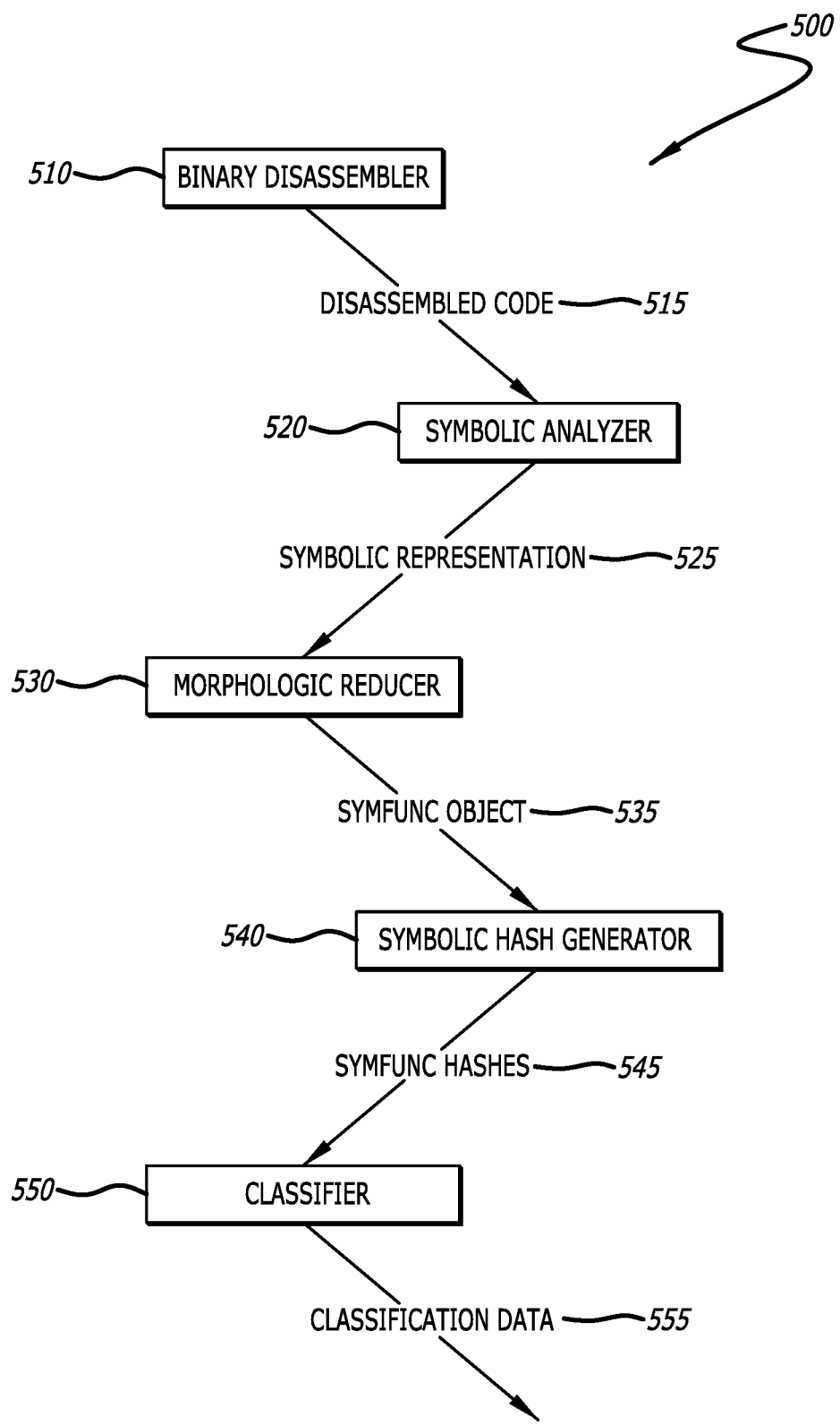
FIG. 5 is an exemplary embodiment of a flowchart partially illustrating the communication between different malware detection logics.

Referring now to FIG. 5, a simplified input/output flowchart 500 of the various malware detection logics and their respective inputs and outputs is shown. This process is similar to the process depicted in FIG. 4, but better highlights the relationship between the various malware detection logics and the types of data that they process.

Upon receipt of a suspicious binary object for evaluation, the binary disassembler 510 generates disassembled code 515 which may contain opcodes, control flow graphs, extracted string and integer constants (for elimination from analysis), and other data relating to the functions.

The disassembled code data 515 is fed into a symbolic analyzer logic 520 that processes and expands the disassembled code data 515 into symbolic representation data 525. The symbolic representation data 525 contains further abstracted data relating to the disassembled code data 515 comprising an abstract syntax tree ("AST") and a list of symboliks which themselves comprise the relationships between the inputs and outputs of each function, describing what every piece of the emulated machine is doing in response to the binary object. These inputs and outputs include passed in arguments, local variables, etc.

The symbolic representation data 525 is fed into a morphologic reducer logic 530 that attempts to eliminate excessive pieces of data and package the data into reduced symfunc object data 535. The elimination of elements of the symbolic representation data 525 can be accomplished through the classification of functions and their actions, allowing for the generating of rule sets that can eliminate aspects of the functions for analysis based on the needs of the user/system administrator.

The reduced symfunc object data 535 is then sent to a symfunc hash generator 540 that generates at least one, but perhaps many symfunc hash values 545. The symfunc hash values can be typical 128-bit hashes but can vary in size and complexity as needed. The hashing process, in order to facilitate comparable results suitable for later comparison and classification, should follow a static, repeatable order/ruleset. By way of example and not limitation, the hashing process can order the symfunc object in a serial fashion with a first classified type of function placed first, followed by a second type of function, etc. Typically, a canonical representation is utilized for the hashing process. The type or ruleset or order does not have to be limited and is only limited by the usefulness of the results based on the hashing process used in the hashes stored in the database.

Generated symfunc hash values 545 are eventually given to the classifier logic 550 which then classifies the symfunc hash values based on a comparison against a database of known symfunc hash values. In response to this classification, the classifier logic 550 generates classification data 555 that can then be transmitted to another set of logic or used internally by the classifier logic 550 to generate a response to the classification. The response can be to let the binary object associated with the classified binary hash pass if it not determined to be malicious. Alternatively, the classification data can be used to generate a report based on any number of behaviors that were pre-determined by the user/system administrator in the case of a finding of malicious binary objects.

V. Detailed Classification Process

Figure 6:
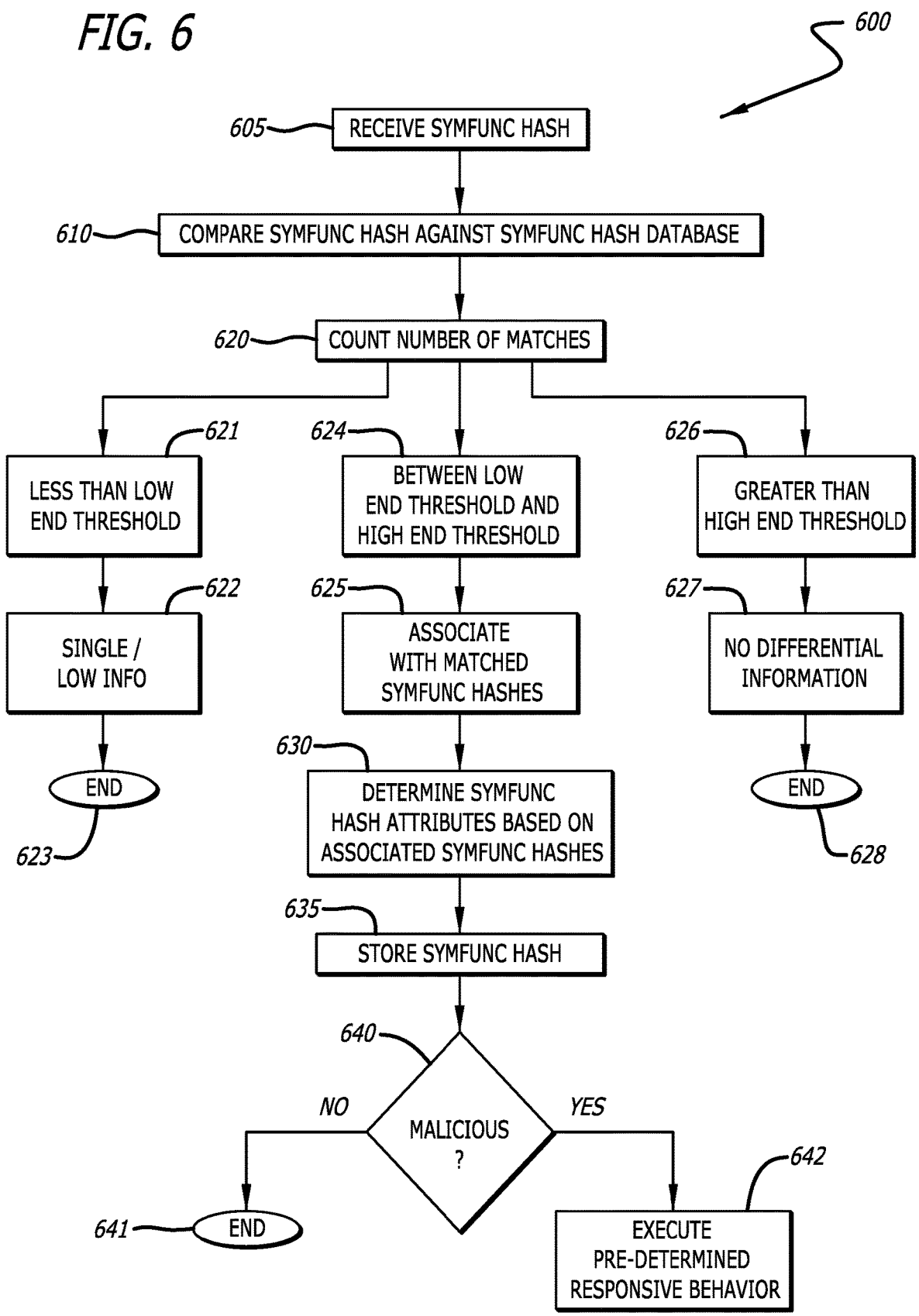
FIG. 6 is an exemplary embodiment of a flowchart of the classification process for analyzing and processing data to determine if a binary object contains malicious code.

Referring now to FIG. 6, an exemplary classification flowchart 600 of the various malware detection logics and their respective inputs and outputs is shown. The classification flowchart 600 depicted is similar to operations 450 through 470 depicted in FIG. 4, although it is contemplated that other embodiments of this flowchart can be utilized based on the needs of the particular application by the user/administrator.

In response to receiving a symfunc hash, the system may begin the process of comparing the received symfunc hash value against the previously generated and stored, known symfunc hash values (blocks 605 and 610). The comparison typically produces data relating to the number of matches the symfunc hash value obtains, along with data relating to the matched symfunc hash values. The classifier logic counts the number of matches to determine the next operation (block 620). It is contemplated that the comparison may be done remotely by sending the received symfunc hash value to a remote system that has a local copy of the symfunc database and sends back data relating to the matches and counts. Furthermore, as outlined above, those skilled in the art would recognize, a "match" may be realized through various methods depending on the application including determining a prescribed level of correlation based on a pre-determined threshold set by the user and/or system administrator.

In the exemplary embodiment illustrated in FIG. 6, the user/system administrator has set both a low and high threshold for the matching evaluation. In response to the number of matches being less than the low end threshold (block 621), the system may determine that there is not enough information to make a useful correlation between the suspect symfunc hash value and the known symfunc hash, determining it to be a singleton or contain low information (block 622), which then ends the process and generates common weighted classification data that can be sent to an analyzer for further evaluation (block 623). Alternatively, in response to the number of matches found to be greater than the high-end threshold (block 626), the system may determine whether no differential information was found (block 627), which also ends the process causing the system to generate common weighted classification data that can be sent to an analyzer for further evaluation (block 628).

Finally, in response to the number of matches being both higher than the lower-end threshold, and lower than the higher-end threshold (block 624), the system may then draw a stronger correlation between the received symfunc hash value and the previously generated and known symfunc hash values in the database that were a match. In many embodiments, this situation can be considered an "anchor match" which can be utilized to create automatic responses and actions not otherwise available in other matches.

In these instances of an anchor match, the system may automatically determine and associate the received symfunc hash value attributes with the matched symfunc hash values and corresponding binary objects (block 630). Further, an anchor match may be automatically stored as another data point in the known symfunc database (block 635). Additionally, anchor matches may allow the system to automatically determine if the received symfunc hash value is malicious (block 640). In cases where the anchor match was to non-malicious binary objects, the process ends (block 641) and no further actions are attempted. Alternatively, when the anchor match is to known malicious code, the system can automatically execute pre-determined responsive behaviors that were requested by the user/system administrator. It is contemplated that data associated with the symfunc objects utilized in the anchor match (code family, type of threat, level of threat, etc.) are utilized to determine what responsive actions are executed (block 642).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An electronic device for classifying malware, the electronic device comprising:
   a processor; and
   a storage device communicatively coupled to the processor, the storage device comprises
   a data store comprising a plurality of previously known symfunc hash values and
   malware detection logic processed by the processor, the malware detection logic to attempt to classify malicious code by utilizing:
   symbolic analyzer logic being processed by the processor, the symbolic analyzer to receive disassembled code data associated with a binary object and generate symbolic representation data associated with the disassembled code data,
   generation logic being processed by the processor, the generator logic to receive the symbolic representation data and generate at least one symfunc hash value based on the symbolic representation data, the generation logic comprises
   morphologic reducer logic to receive the symbolic representation data and produce symfunc object data; and
   symbolic hash generator to receive symfunc object data and generate the at least one symfunc hash value, and
   malware classification logic being processed by the processor, the malware classification logic to (i) receive the at least one symfunc hash value, (ii) compare the received symfunc hash value against the plurality of previously known symfunc hash values, and (iii) determine if the binary object comprises malicious code based on results of a comparison between the received symfunc hash value and the plurality of previously known symfunc hash values.

2. The electronic device of claim 1, wherein the at least one symfunc hash value corresponds to an abstraction of the binary object.

3. The electronic device of claim 2, wherein the malware classification logic determines whether the binary object potentially includes malicious code based on whether the received symfunc hash value matches at least a first pre-determined number of previously known symfunc hash values.

4. The electronic device of claim 3, wherein the malware classification logic determines whether the binary object potentially includes malicious code based on whether the received symfunc hash value matches less than a second pre-determined number of previously known symfunc hash values.

5. The electronic device of claim 4, wherein the malware classification logic determines that the received binary code includes malicious code upon the received symfunc hash value matching a number of previously known symfunc hash values that are both greater than the first pre-determined number and less than the second pre-determined number.

6. The electronic device of claim 1, the storage device further comprising responsive logic being processed by the processor, the responsive logic to receive at least one pre-determined responsive behavior input and generate responsive behavior actions based on the received at least one pre-determined responsive behavior input.

7. The electronic device of claim 1, wherein the malware classification logic, in response to determining that the binary object comprises malicious code, activates pre-determined responsive behavior actions.

8. The electronic device of claim 7, wherein the pre-determined responsive behavior action is the generation of an alert communicated to a user.

9. The electronic device of claim 8, wherein the generated alert includes information associated with the plurality of previously known symfunc hash values associated with the binary object.

10. The electronic device of claim 1, wherein the malware detection logic stores the generated symfunc hash value in the data store being a database upon determination of the presence of malicious code associated with the binary object.

11. The electronic device of claim 1 wherein the database further comprises capability data associated with each symfunc hash value determined to be malicious.

12. The electronic device of claim 1, wherein the storage device further comprises binary disassembler logic being processed by the processor, the binary disassembler logic to receive the binary object and disassemble the binary object into the disassembled code data.

13. A method for classifying malware, the method comprising:
   receiving a binary object for classification;
   disassembling the received binary object to generate disassembled code data;
   generating symbolic representation data based on the disassembled code data;
   reducing morphology of the disassembled code data to produce at least one symbolic function (symfunc) object;
   hashing the symfunc object to generate at least one symfunc hash value; and
   classifying the binary object as containing malicious code by comparing the symfunc hash value to a plurality of previously known symfunc hash values and the symfunc hash value matches at least a first threshold of previously known symfunc hash values.

14. The method of claim 13 further comprising:
receiving at least one pre-determined responsive behavior input; and
generating one or more responsive behavior actions based on the received at least one pre-determined responsive behavior input.

15. The method of claim 14, wherein the generating of the one or more responsive behavior actions includes generating an alert communicated to a user.

16. The method of claim 15, wherein the generated alert includes information associated with the plurality of previously known symfunc hash values associated with the classified binary object.

17. The method of claim 13, wherein, in response to classifying that the received binary object includes malicious code, activating at least one generated pre-determined responsive behavior action.

18. The method of claim 13, wherein the classifying of the binary object as including malicious code is further based on whether the compared symfunc hash value matches less than a second threshold of previously known symfunc hash values.

19. The method of claim 13, wherein the classifying of the binary object is automatically completed upon the compared symfunc hash value matching a number of previously known symfunc hash values that are both greater than the first threshold and less than the second threshold of previously known symfunc hash values.

20. The method of claim 13, further comprising storing the generated symfunc hash value in the database upon determination of the presence of malicious code associated with the binary object.

21. The method of claim 13, wherein the database further comprises capability data associated with each symfunc hash value classified to be malicious.

22. The method of claim 13, wherein the first threshold of previously known symfunc hash values corresponds to a first pre-determined number of previously known symfunc hash values and the second threshold of previously known symfunc hash values corresponds to a second threshold number of previously known symfunc hash values.

23. A non-transitory computer readable medium including software that, when executed by one or more hardware processors, performs operations to classify a binary object and comprising:
a binary disassembler configured to disassemble a received binary object and generate disassembled code data;
a symbolic analyzer configured to generate symbolic representation data based on the disassembled code data;
a morphologic reducer configured to reduce morphology of the disassembled code data to produce at least one symbolic function (symfunc) object;
a symbolic hash generator configured to hash the symfunc object within a symbolic hash generator to generate at least one symfunc hash value; and
a classifier configured to classify the received binary object as containing malicious code by at least comparing the symfunc hash value to a plurality of previously known symfunc hash values, wherein a classification of the received binary object as to including a presence of malicious code is further based on whether the compared symfunc hash value matches at least a first threshold of the plurality of previously known symfunc hash values.

24. The non-transitory computer readable medium of claim 23, further comprising receiving at least one pre-determined responsive behavior input; and
generating responsive behavior actions based on the received at least one pre-determined responsive behavior input.

25. The non-transitory computer readable medium of claim 24 wherein the method, in response to classifying that the at least one received binary object comprises malicious code, activates at least one generated pre-determined responsive behavior action.

26. The non-transitory computer readable medium of claim 23 wherein the classification of the presence of malicious code within the at least one received binary object is further based on whether the compared symfunc hash value matches less than a second threshold of previously known symfunc hash values.

27. The non-transitory computer readable medium of claim 23, wherein the generation of the responsive behavior actions comprises generating.

* * * * *